US009261953B2

(12) United States Patent
Kakuta et al.

(10) Patent No.: US 9,261,953 B2
(45) Date of Patent: Feb. 16, 2016

(54) INFORMATION PROCESSING APPARATUS FOR DISPLAYING VIRTUAL OBJECT AND METHOD THEREOF

(75) Inventors: Hiroyuki Kakuta, Yokohama (JP); Yasumi Tanaka, Funabashi (JP); Takashi Aso, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 577 days.

(21) Appl. No.: 13/216,597

(22) Filed: Aug. 24, 2011

(65) Prior Publication Data
US 2012/0050162 A1    Mar. 1, 2012

(30) Foreign Application Priority Data
Aug. 27, 2010 (JP) ................................ 2010-191211

(51) Int. Cl.
G09G 5/08 (2006.01)
G06F 3/033 (2013.01)
G06F 3/01 (2006.01)
G06F 3/03 (2006.01)
G06F 3/0481 (2013.01)

(52) U.S. Cl.
CPC ............... *G06F 3/011* (2013.01); *G06F 3/012* (2013.01); *G06F 3/0304* (2013.01); *G06F 3/04812* (2013.01); *G06F 3/04815* (2013.01)

(58) Field of Classification Search
CPC ....... G06F 3/011; G06F 3/012; G06F 3/0304; G06F 3/0481; G06F 3/04812; G06F 3/04815

USPC ................................................... 345/156, 158
See application file for complete search history.

(56) References Cited

U.S. PATENT DOCUMENTS

| 6,241,609 | B1 * | 6/2001 | Rutgers ........................... 463/31 |
| 2003/0032484 | A1 * | 2/2003 | Ohshima et al. ................ 463/43 |
| 2005/0212765 | A1 * | 9/2005 | Ogino ........................... 345/156 |
| 2006/0026533 | A1 * | 2/2006 | Napoli et al. ................. 715/850 |
| 2006/0170652 | A1 * | 8/2006 | Bannai et al. ................ 345/156 |
| 2008/0106488 | A1 * | 5/2008 | Okuno .............................. 345/8 |

FOREIGN PATENT DOCUMENTS

| JP | 6-83935 A | 3/1994 |
| JP | 6-337756 A | 12/1994 |
| JP | 9-305306 A | 11/1997 |
| JP | 2008-40832 A | 2/2008 |

* cited by examiner

*Primary Examiner* — Stephen Sherman
(74) *Attorney, Agent, or Firm* — Canon USA Inc. IP Division

(57) ABSTRACT

An information apparatus is provided. The information processing apparatus includes a viewpoint position measurement unit configured to measure a position of a viewpoint of an operator, an operation position measurement unit configured to measure a position of an operation unit operated by the operator, and a determination unit configured to determine a position and an orientation of a cursor to be displayed based on the position of the viewpoint and the position of the operation unit.

14 Claims, 8 Drawing Sheets

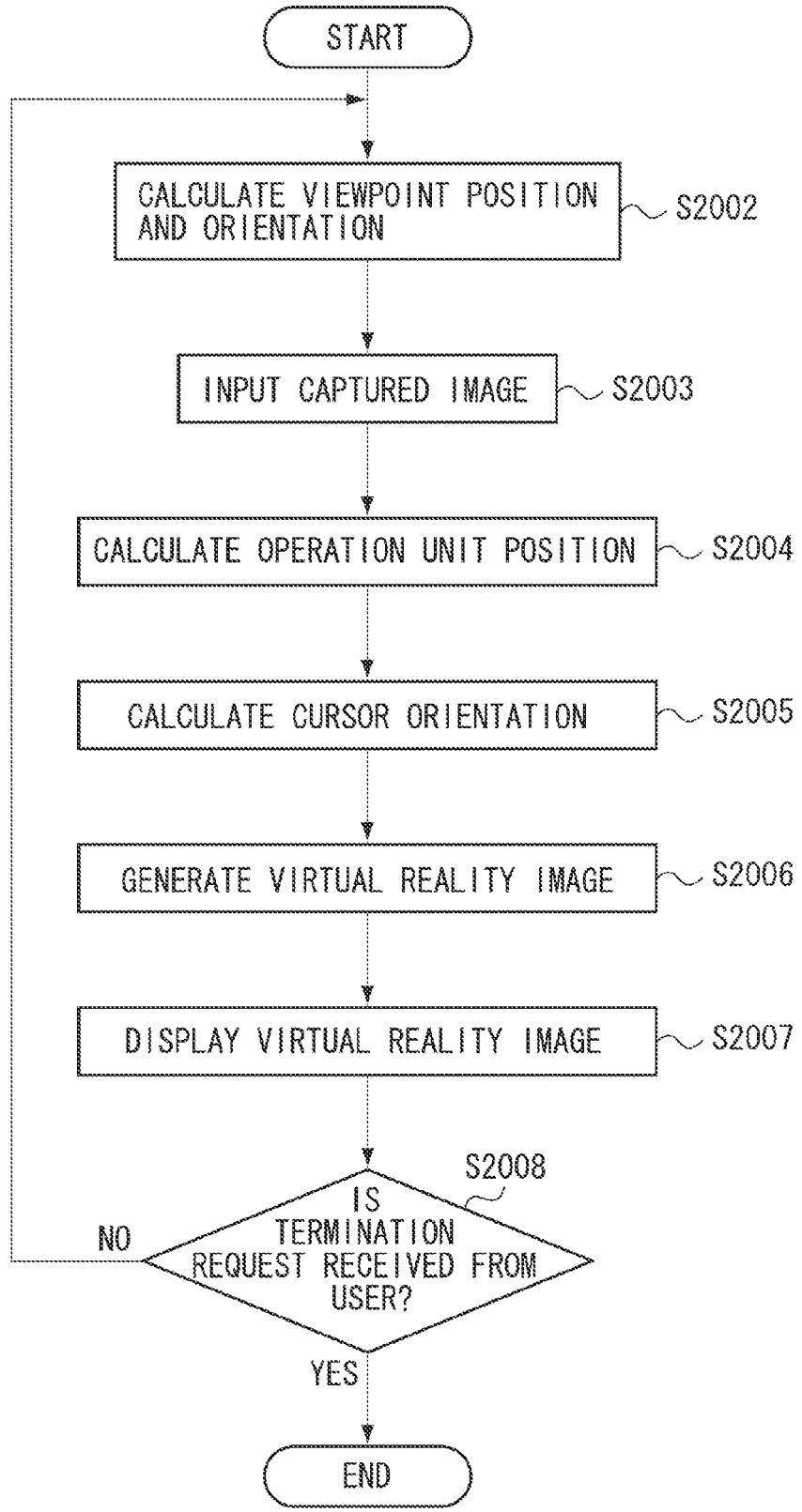

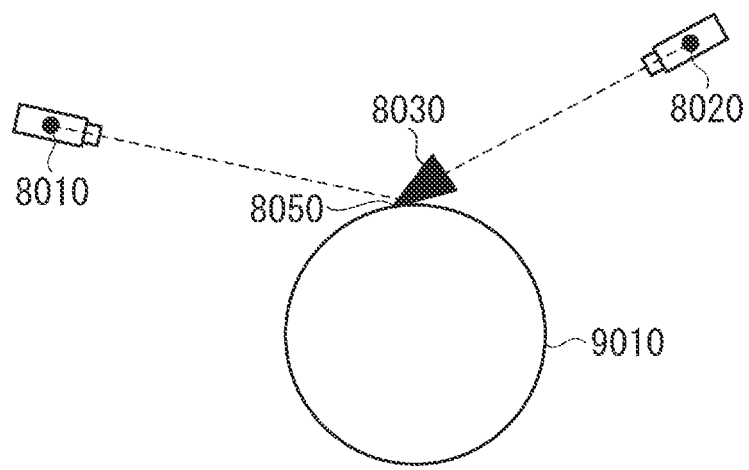
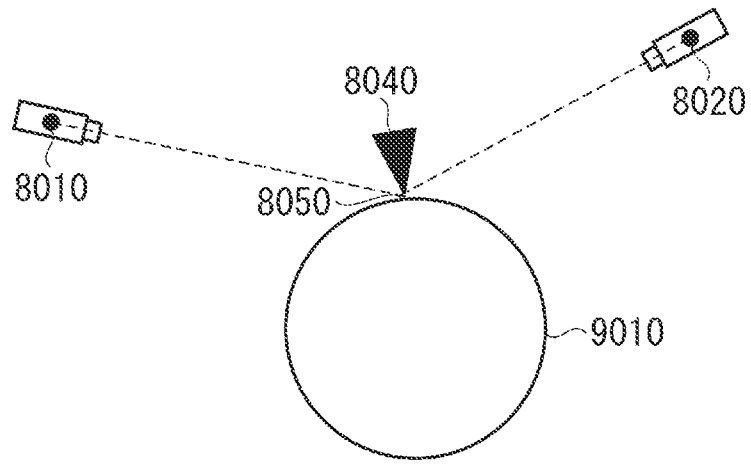

INFORMATION PROCESSING APPARATUS FOR DISPLAYING VIRTUAL OBJECT AND METHOD THEREOF

BACKGROUND OF THE INVENTION

1. Field of the Invention

The present invention relates to an information processing apparatus and an information processing method for generating and displaying a virtual object in a virtual reality space or a mixed reality space.

2. Description of the Related Art

In recent years, researches on mixed reality (MR) for achieving a seamless integration of a physical space with a virtual space have been actively made. An image display apparatus for presenting a mixed reality is, for example, an apparatus having a configuration below. Specifically, the apparatus displays an image formed by superimposing an image (for example, a virtual object generated by computer graphics or character information) in a virtual reality space generated depending on a position and an orientation of an imaging apparatus on an image in a physical space captured by the imaging apparatus such as a video camera. In such an apparatus, for example, a head-mounted display (HMD) can be used.

The image display apparatus can be implemented by an optical see-through method for displaying an image in a virtual reality space generated depending on a position and an orientation of a viewpoint of an operator on an optical see-through display mounted to the head of the operator.

Meanwhile, with the development of IT technology, tools for drawing letters or pictures conventionally implemented by media such as paper and pencils have been computerized. Further, tablet apparatuses that use a pointing device such as a pen enabling us to input information with a sense similar to writing down on paper, even in a virtual space have been developed. For example, instead of two-dimensional position measurement of the tip of a pen-type device in the conventional tablet apparatus, Japanese Patent Application Laid-Open No. 9-305306 discusses a technique for three-dimensionally measuring a pen tip. By the technique, the operation of the pen tip held by the operator himself/herself can be recognized in the height direction. By varying a scale of a cursor or display of shadow displayed in response to movement of the pen tip in the height direction, the position of the pen tip in the virtual space can be further clearly presented.

However, in the known methods, when the operator indicates a point in a virtual reality space or a mixed reality space using a cursor, the point indicated by the cursor may not be visually recognized.

SUMMARY OF THE INVENTION

The present invention provides a method for enabling an operator to surely visually recognize a point indicated by a cursor in a virtual reality space or a mixed reality space.

According to an aspect of the present invention, an information apparatus is provided. The information processing apparatus includes a viewpoint position measurement unit configured to measure a position of a viewpoint of an operator, an operation position measurement unit configured to measure a position of an operation unit operated by the operator, and a determination unit configured to determine a position and an orientation of a cursor to be displayed based on the position of the viewpoint and the position of the operation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating a processing procedure according to the first exemplary embodiment.

FIGS. 8A and 8B illustrate cursor orientations according to a third exemplary embodiment.

DESCRIPTION OF THE EMBODIMENTS

Various exemplary embodiments, features, and aspects of the invention will be described in detail below with reference to the drawings.

Figure 1:
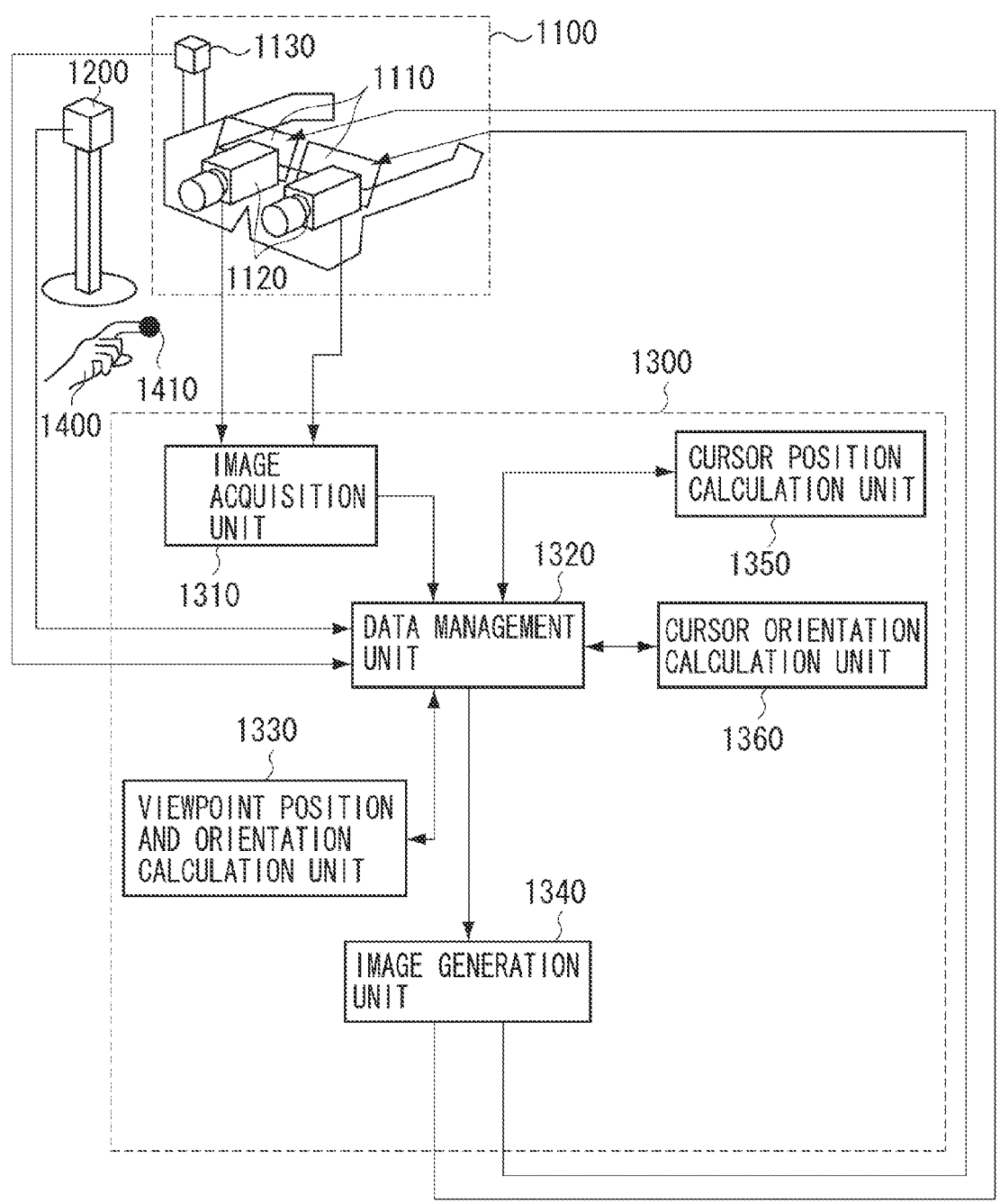
FIG. 1 is a block diagram illustrating a system configuration according to a first exemplary embodiment.

FIG. 1 is a block diagram illustrating a functional configuration of a system according to the first exemplary embodiment. As illustrated in FIG. 1, the system according to the exemplary embodiment includes an information processing apparatus 1300 and a HMD 1100, which is an example of a head-mounted device. An operation unit 1400 uses a color marker 1410 to calculate a position of a cursor in the information processing apparatus 1300. As long as the position of the operation unit 1400 can be measured, it is not always necessary to use the color marker, and the method can be any method.

The information processing apparatus 1300 includes an image acquisition unit 1310, a data management unit 1320, a viewpoint position and orientation calculation unit 1330, a cursor position calculation unit 1350, a cursor orientation calculation unit 1360, and an image generation unit 1340. The HMD 1100 includes a display unit 1110, an imaging unit 1120, and a position and orientation sensor 1130. The information processing apparatus 1300 is connected with the HMD 1100 such that the information processing apparatus 1300 can perform data communication with the HMD 1100. The connection between the information processing apparatus 1300 and the HMD 1100 can be implemented by wired or wireless connection.

The image acquisition unit 1310 stores an image captured by the imaging unit 1120 as image data in the data management unit 1320. The data management unit 1320 stores, together with the image data, a position measured by the position and orientation sensor 1130 from a magnetic field generated by a magnetic transmitter 1200. The data management unit 1320 performs management of various types of data for implementing the apparatus.

Figure 3A:
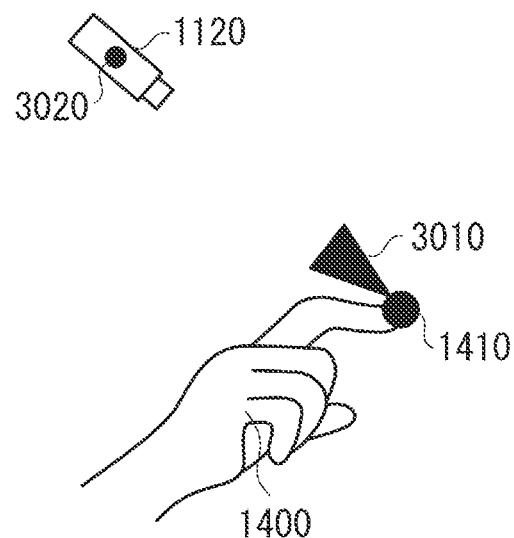
FIGS. 3A and 3B illustrate embodiments according to the first exemplary embodiment.
Figure 3B:
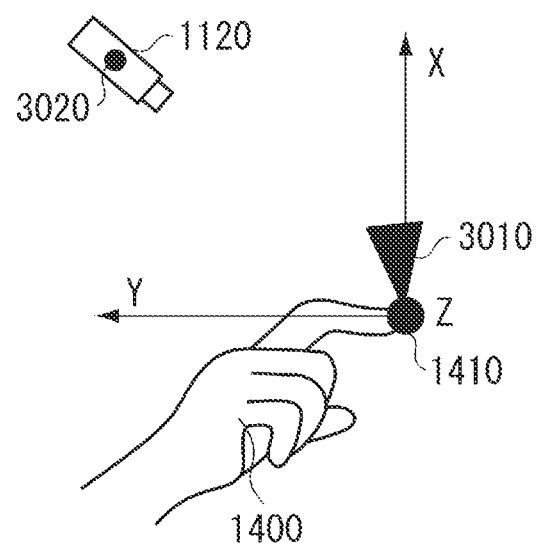

The cursor position calculation unit 1350 perform operation position measurement for calculating a position of the color marker 1410 included in the operation unit 1400 from the captured image stored in the data management unit 1320 using a method, for example, a stereo matching method, or a visual cone intersection method. In the processing, the calculated position can be corrected. The cursor orientation calculation unit 1360 calculates an orientation of a cursor such that as illustrated in FIG. 3B, the operator can see the point indicated by the cursor object 3010. Detailed description of the operation is described below with reference to the flowchart in FIG. 2.

Figure 4:
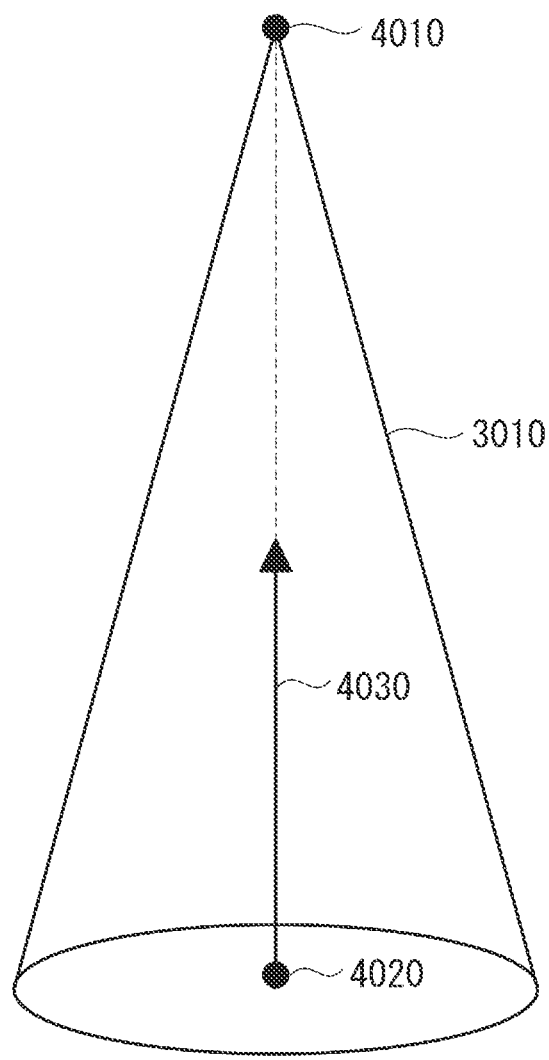
FIG. 4 illustrates a cursor object according to the first exemplary embodiment.

The cursor object 3010 used in the exemplary embodiment is a cone having the tip and a directionality. FIG. 4 illustrates the shape of the cursor. A tip 4010 of the cone is a cursor position 1410. A vector 4030 of the line segment connecting a center 4020 of the base of the cone and the tip 4010 is a direction of the cursor object 3010. The viewpoint position and orientation calculation unit 1330 performs viewpoint position measurement as a position of the position and orientation sensor 1130 from a magnetic field generated by the magnetic transmitter 1200, and performs calculation of a viewpoint position from the data stored in the data management unit 1320. The image generation unit 1340 generates an image in a virtual reality space containing a virtual cursor object. In the processing, a virtual reality image containing a virtual object stored in the data management unit 1320 can be generated.

The image display unit 1110 displays the image generated in the image generation unit 1340. FIG. 2 is a flowchart illustrating a processing procedure according to the exemplary embodiment. In step S2002, the viewpoint position and orientation calculation unit 1330 calculates a position and an orientation of a viewpoint from position and orientation information of the position and orientation sensor 1130 stored in the data management unit 1320.

In step S2003, the data management unit 1320 stores a captured image acquired by the imaging unit 1120. In step S2004, the cursor position calculation unit 1350 calculates a position of the color marker 1410 from the captured image stored in the data management unit 1320 and set it as a position of the operation unit 1400.

In step S2005, the cursor orientation calculation unit 1360 calculates a position and orientation of the cursor. First, as illustrated in FIG. 3A, the tip 4010 of the cursor object 3010 in FIG. 4 is moved to the barycenter of the color marker 1410. Then, the orientation of the cursor object is calculated such that the straight line passing through a viewpoint position 3020 and the barycenter of the color marker 1410 passes through the center 4020 of the base of the cursor object 3010. After the calculation, as will be understood from FIG. 3B, with the barycenter of the color marker 1410 as the center, the cursor object rotates around the z axis of the local coordinate system by a predetermined angle. In other words, to the straight line passing through the viewpoint position 3020 and the barycenter of the color marker 1410, the orientation of the cursor object is tilted to form the predetermined angle. The predetermined angle is an angle equal to or greater than a threshold sufficient to enable visual recognition of the cursor object. As long as the orientation is changed such that the operator can view the point indicated by the cursor, any method can be used.

In step S2006, the image generation unit 1340 generates a virtual reality image containing the cursor object 3010. In the processing, a virtual reality image containing a virtual object stored in the data management unit 1320 can be generated. In step S2007, the display unit 1110 displays the virtual reality display generated in step S2006. In step S2008, if the information processing apparatus 1300 receives a termination request from the user, the apparatus ends the processing, and if the apparatus does not receive the termination request, return to the processing in step S2002, and repeats the processing.

A second exemplary embodiment is described. In the above-described first exemplary embodiment, the operator indicates a point in a space. In the exemplary embodiment, the operator indicates a point on a virtual object surface in a space.

Figure 5:
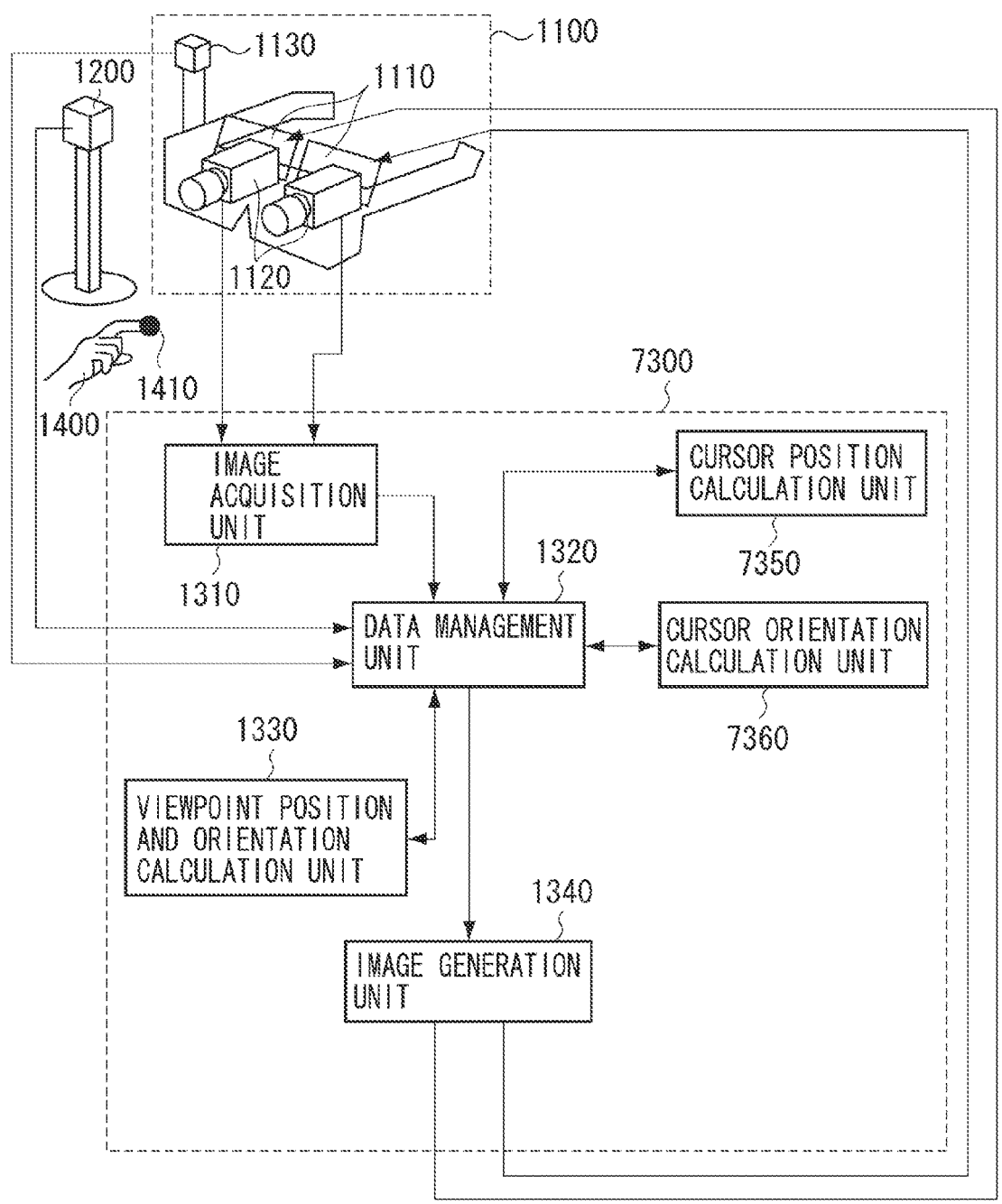
FIG. 5 is a block diagram illustrating a system configuration according to a second exemplary embodiment.
Figure 6:
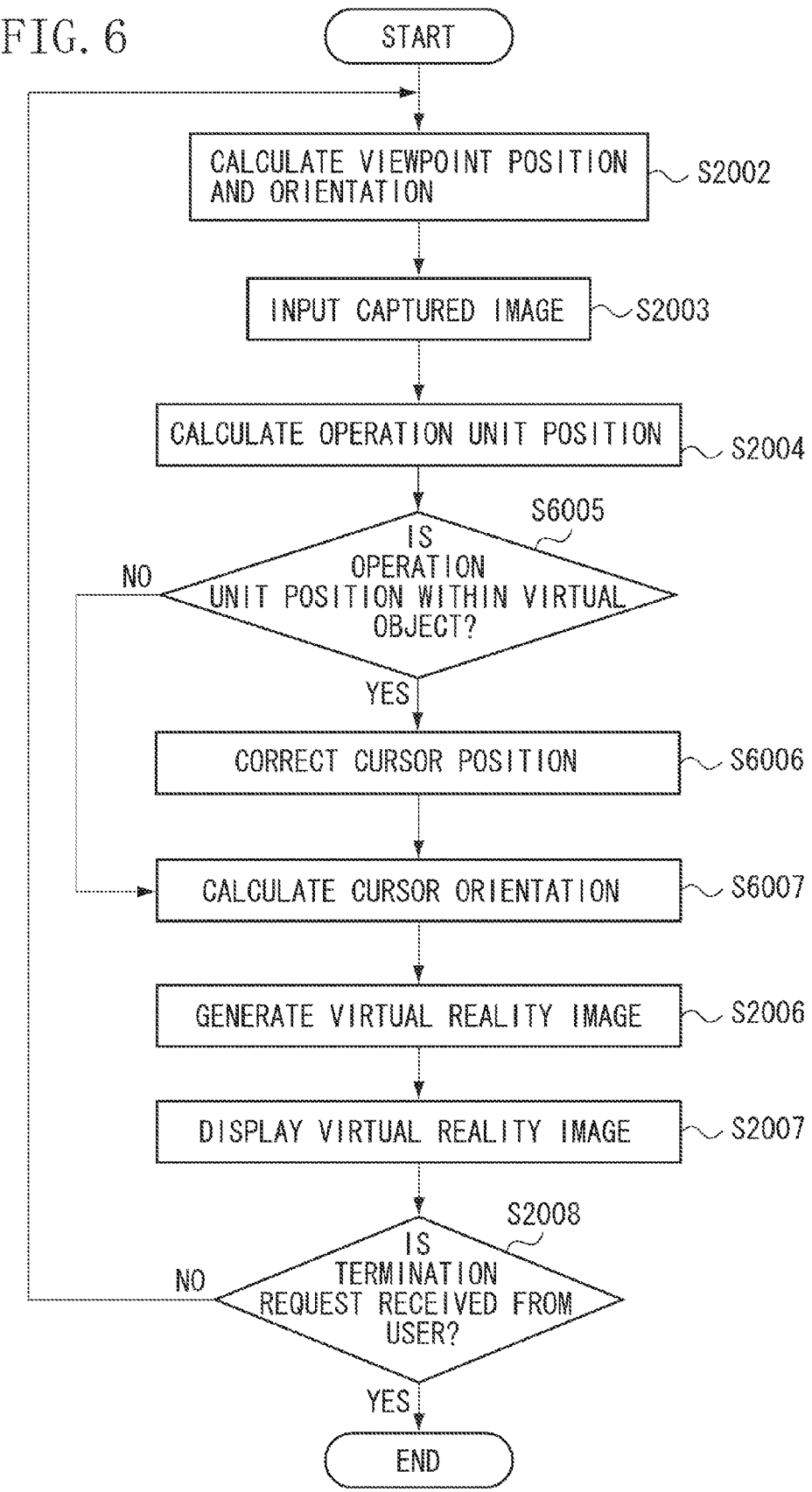
FIG. 6 is a flowchart illustrating a processing procedure according to the second exemplary embodiment.

The exemplary embodiment is described with reference to FIGS. 5 and 6. FIG. 5 is a block diagram illustrating a functional configuration of a system according to the second exemplary embodiment. In FIG. 5, to parts similar to those in FIG. 1, the same reference numerals are applied, and their descriptions are omitted. FIG. 6 is a flowchart illustrating a processing procedure according to the second exemplary embodiment. In FIG. 6, to parts similar to those in FIG. 2, the same reference numerals are applied, and their descriptions are omitted.

In step S6005, a cursor position calculation unit 7350 determines whether the position of the color marker 1410 is within the virtual object. If the cursor position calculation unit 7350 determines that the position of the color marker 1410 is within the virtual object (YES in step S6005), the processing proceeds to step S6006. In the other cases (NO in step S6005), the processing proceeds to step S6007.

Figure 7A:
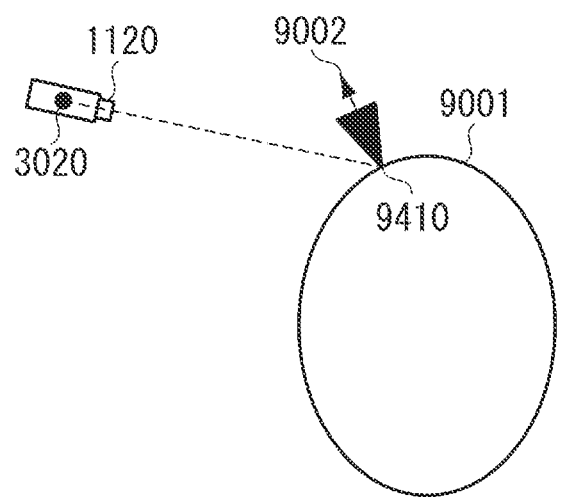
FIGS. 7A and 7B illustrate cursor orientations according to the second exemplary embodiment.
Figure 7B:
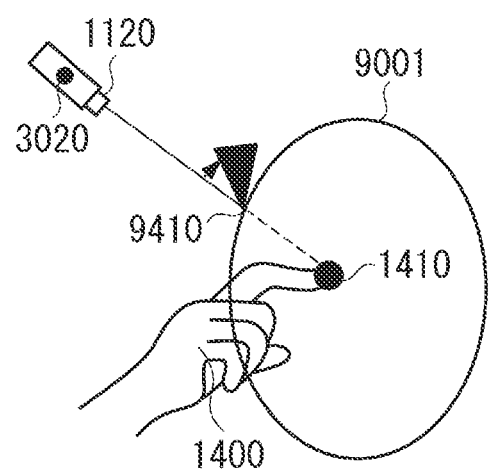

In step S6006, the cursor position calculation unit 7350 corrects the cursor position. As illustrated in FIG. 7B, if the color marker 1410 is inside a virtual object 9001, to prevent the cursor from being buried in the virtual object, the cursor position calculation unit 7350 corrects the cursor position of the color marker 1410 to move to a cursor correction position 9410. The cursor correction position 9410 is a point of intersection of the line segment connecting the viewpoint position 3020 and the cursor position of the color marker 1410 and the virtual object surface. The value corrected in the processing is transmitted to the data management unit 1320.

In step S6007, a cursor orientation calculation unit 7360 calculates the orientation of the cursor. In step S6006, if the cursor position correction is not performed, calculation similar to that in step S2005 in the first exemplary embodiment is performed. In step S6006, if the cursor position correction is performed, the cursor orientation is calculated as described below.

The cursor orientation calculation in the case where the cursor position correction is performed in step S6006 is described with reference to FIGS. 7A and 7B. As illustrates in FIG. 7A, if a cursor correction position 9410 can be visually recognized from the viewpoint position 3020 of the operator, the cursor orientation can be set to a direction opposite to the direction of a normal 9002 on the virtual object surface at the cursor correction position 9410. However, in the case where the positional relationship between the viewpoint position 3020 and the cursor correction position 9410 is the relationship illustrated in FIG. 7B, if the cursor direction is as above-described, the cursor correction position 9410 is interrupted by the base of the cursor object 3010, and the operator cannot visually recognize the cursor correction position 9410. To solve the problem, a threshold is set to the angles between an eye vector and the normal vector. If the angle is less than the threshold, the orientation of the cursor is set to the direction opposite to the normal direction. If the angle is equal to or greater than the threshold, to enable the operator to visually recognize the cursor correction position 9410, the orientation of the cursor is tilted by a predetermined angle from the direction opposite to the normal direction. In the processing, further, the cursor orientation calculation unit 7360 can vary the orientation of the virtual cursor depending on a temporal change in relative position between the viewpoint position 3020 and the cursor position of the color marker 1410 or the cursor correction position 9410 within a range not exceeding the threshold.

A third exemplary embodiment is described. In the above-described first exemplary embodiment and the second exemplary embodiment, the number of the operators is one. In the exemplary embodiment, the number of the operators is a plurality of number, and a point indicated by the cursor can be viewed from the all operators. In the exemplary embodiment, similarly to the first exemplary embodiment illustrated in FIG. 1, a system including the information processing apparatus 1300, the HMD 1100, which is an example of the head-mounted device, and the operation unit 1400 is used. In the exemplary embodiment, such a system is provided for each operator. The exemplary embodiment is described with reference to FIGS. 8A and 8B. A cursor object viewed from a viewpoint position 8010 of an operator A is a cursor object 8030. A point indicated by the operator A with the color marker 1410 is a point 8050. In this case, a position and an orientation of the cursor object are determined by the method according to the second exemplary embodiment.

However, when the orientation of the cursor object is measured using the method according to the second exemplary embodiment, as illustrated in FIG. 8A, an operator B cannot visually recognize the point 8050 indicated by the operator A. To solve the problem, in the exemplary embodiment, as illustrated in FIG. 8B, the orientation of the cursor is tilted such that the individual operators can visually recognize the point 8050 indicated by the color marker 1410 from their individual viewpoint positions.

The exemplary embodiments have been described in detail above. The present invention can be implemented, for example, as a system, an apparatus, a method, a program, or a storage medium storing the program. Specifically, the present invention can be applied to a system including a plurality of devices or an apparatus consists of a single device.

The present invention can also be achieved by directly or remotely providing a program of software to the system or the device and by reading and executing the provided program code with a computer of the system or the device to achieve the functions of the above-described exemplary embodiments. In such a case, the program to be provided is a computer program corresponding to the flowcharts illustrated in the drawings according to the exemplary embodiments.

In addition to the implementation of the functions of the above-described exemplary embodiments by reading and executing the computer-readable program by the computer, according to instructions of the program, the functions according to the exemplary embodiments can be implemented in cooperation with an operating system (OS) running on the computer, or the like. In such a case, the OS or the like can carry out a part of or the whole of the actual processing, thereby implementing the above-described functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-191211 filed Aug. 27, 2010, which is hereby incorporated by reference herein in its entirety.

What is claimed is:

1. An information processing apparatus comprising:
a viewpoint position measurement unit configured to measure a position of a viewpoint of an operator;
an operation position measurement unit configured to measure a position of an operation unit operated by the operator; and
a determination unit configured to determine a position of a cursor to be displayed, based on the position of the viewpoint and the position of the operation unit, and determine an orientation of the cursor such that an angle of a predetermined threshold or more is formed from a direction indicated by the cursor and a direction of a line of sight of the operator.

2. The information processing apparatus according to claim 1, wherein the determination unit determines the position of the operation unit to be the position of the cursor.

3. The information processing apparatus according to claim 1, wherein the determination unit determines a point of intersection of a line of sight connecting the position of the viewpoint and the position of the operation unit and a surface of a virtual object, to be the position of the cursor when the cursor indicates the virtual object.

4. The information processing apparatus according to claim 3, wherein the determination unit determines the orientation of the cursor using a direction of a normal of the virtual object and the line of sight at the intersection.

5. The information processing apparatus according to claim 4, wherein the determination unit determines a direction opposite to the direction of the normal, to be the orientation of the cursor when an angle between the direction of the normal and the line of sight is less than a threshold, and determines a direction tilted from the direction opposite to the direction of the normal by a predetermined angle, to be the orientation of the cursor when the angle between the direction of the normal and the line of sight is equal to or greater than the threshold.

6. The information processing apparatus according to claim 1, wherein the cursor is a cone having a tip and a directionality.

7. An information processing method comprising:
performing viewpoint position measurement to input a position of a viewpoint of an operator;
performing operation position measurement to measure a position of an operation unit operated by the operator; and
determining a position of a cursor to be displayed, based on the position of the viewpoint and the position of the operation unit, and determining an orientation of the cursor such that an angle of a predetermined threshold or more is formed from a direction indicated by the cursor and a direction of a line of sight of the operator.

8. A non-transitory computer-readable storage medium for storing a program for making a computer execute a method comprising:
performing viewpoint position measurement to input a position of a viewpoint of an operator;
performing operation position measurement to measure a position of an operation unit operated by the operator; and
determining a position of a cursor to be displayed, based on the position of the viewpoint and the position of the operation unit, and determining an orientation of the cursor such that an angle of a predetermined threshold or more is formed from a direction indicated by the cursor and a direction of a line of sight of the operator.

9. An information processing apparatus comprising:
a viewpoint position measurement unit configured to measure a position of a viewpoint of an operator; and
a determination unit configured to determine a position of a cursor object to be displayed, based on the position of the viewpoint, and determine an orientation of the cursor object such that an angle of a predetermined threshold or more is formed from a direction indicated by the cursor object and a direction of a line of sight of the operator.

10. An information processing method comprising:
measuring a position of a viewpoint of an operator; and
determining a position of a cursor object to be displayed, based on the position of the viewpoint, and determining an orientation of the cursor object such that an angle of a predetermined threshold or more is formed from a direction indicated by the cursor object and a direction of a line of sight of the operator.

11. A non-transitory computer-readable storage medium for storing a program for making a computer execute a method comprising:
measuring a position of a viewpoint of an operator; and
determining a position of a cursor object to be displayed, based on the position of the viewpoint, and determining an orientation of the cursor object such that an angle of a predetermined threshold or more is formed from a direction indicated by the cursor object and a direction of a line of sight of the operator.

12. An information processing apparatus comprising:
a viewpoint position measurement unit configured to measure a position of a viewpoint of an operator;
a first determination unit configured to determine a position of a cursor object based on the position of the viewpoint;
a second determination unit configured to determine an orientation of the cursor object, wherein said orientation forms an angle of a predetermined threshold or more from a direction indicated by the cursor object and a direction of a line of sight of the operator; and
a display control unit configured to display the cursor object based on the position determined by said first determination unit and the orientation determined by said second determination unit.

13. An information processing method comprising:
measuring a position of a viewpoint of an operator;
determining a position of a cursor object based on the position of the viewpoint;
determining an orientation of the cursor object, wherein said orientation forms an angle of a predetermined threshold or more from a direction indicated by the cursor object and a direction of a line of sight of the operator; and
displaying the cursor object based on the position and the orientation.

14. A non-transitory computer-readable storage medium for storing a program for making a computer execute a method comprising:
measuring a position of a viewpoint of an operator;
determining a position of a cursor object based on the position of the viewpoint;
determining an orientation of the cursor object, wherein said orientation forms an angle of a predetermined threshold or more from a direction indicated by the cursor object and a direction of a line of sight of the operator; and
displaying the cursor object based on the position and the orientation.

* * * * *